United States Patent
Holkal

(10) Patent No.: US 12,408,032 B2
(45) Date of Patent: Sep. 2, 2025

(54) SYSTEM AND METHOD FOR SECURE CONNECTION OF HEADLESS BLUETOOTH DEVICE

(71) Applicant: Sasken Technologies Ltd, Bengaluru (IN)

(72) Inventor: Jayasimha Narasimha Murthy Holkal, Bengaluru (IN)

(73) Assignee: SASKEN TECHNOLOGIES LTD, Bengaluru (IN)

( * ) Notice: Subject to any disclaimer, the term of this patent is extended or adjusted under 35 U.S.C. 154(b) by 261 days.

(21) Appl. No.: 18/180,341

(22) Filed: Mar. 8, 2023

(65) Prior Publication Data

US 2023/0300614 A1 Sep. 21, 2023

(30) Foreign Application Priority Data

Mar. 18, 2022 (IN) .............................. 202241015003

(51) Int. Cl.
*H04W 12/00* (2021.01)
*H04W 12/03* (2021.01)
*H04W 12/06* (2021.01)
*H04W 12/08* (2021.01)
*H04W 12/106* (2021.01)
(Continued)

(52) U.S. Cl.
CPC ........... *H04W 12/06* (2013.01); *H04W 12/03* (2021.01); *H04W 12/106* (2021.01); *H04W 12/50* (2021.01)

(58) Field of Classification Search
CPC ... H04W 12/06; H04W 12/03; H04W 12/106; H04W 12/50
See application file for complete search history.

(56) References Cited

U.S. PATENT DOCUMENTS 10,219,106 B1 * 2/2019 Lam ..................... H04W 12/108
2016/0330182 A1 * 11/2016 Jeon ....................... H04W 12/06
(Continued)

FOREIGN PATENT DOCUMENTS

WO WO-2013191648 A1 * 12/2013 .......... H04W 12/003

OTHER PUBLICATIONS

Jianqi Du; Fenghao Xu; Chennan Zhang; Zidong Zhang; Xiaoyin Liu; Pengcheng Ren; Wenrui Diao; Shanqing Guo; Kehuan Zhang; "Identifying the BLE Misconfigurations of IoT Devices through Companion Mobile Apps", 19th Annual IEEE International Conference on SECON; Year 2022; Publisher: IEEE; pp. 343-351 (Year: 2022).*

*Primary Examiner* — Fatoumata Traore
*Assistant Examiner* — Courtney D Fields

(57) ABSTRACT

A system for enabling a headless Bluetooth device to establish a secure connection with a peer device is disclosed. The system includes the Bluetooth device configured for sending encrypted predefined first data to the peer device. The peer device is configured for receiving the data and sending it along with a predefined second data to a server, which comprises a second user confirm value. The server configured for receiving the data from the peer device and processing it for authenticating the received data and, on successful authentication, sending it to the peer device. The peer device is configured for receiving the data and sending it to the Bluetooth device and the Bluetooth device is configured processing it for authenticating the received data and, on successful authentication, bonding and communicating securely with the peer device.

17 Claims, 8 Drawing Sheets

(51) Int. Cl.
*H04W 12/50* (2021.01)
*H04L 9/08* (2006.01)
*H04L 29/06* (2006.01)

(56) References Cited

U.S. PATENT DOCUMENTS

2017/0201886 A1* 7/2017 Yang .................... H04W 12/06
2020/0196122 A1* 6/2020 Junk .................... H04L 9/3213

* cited by examiner

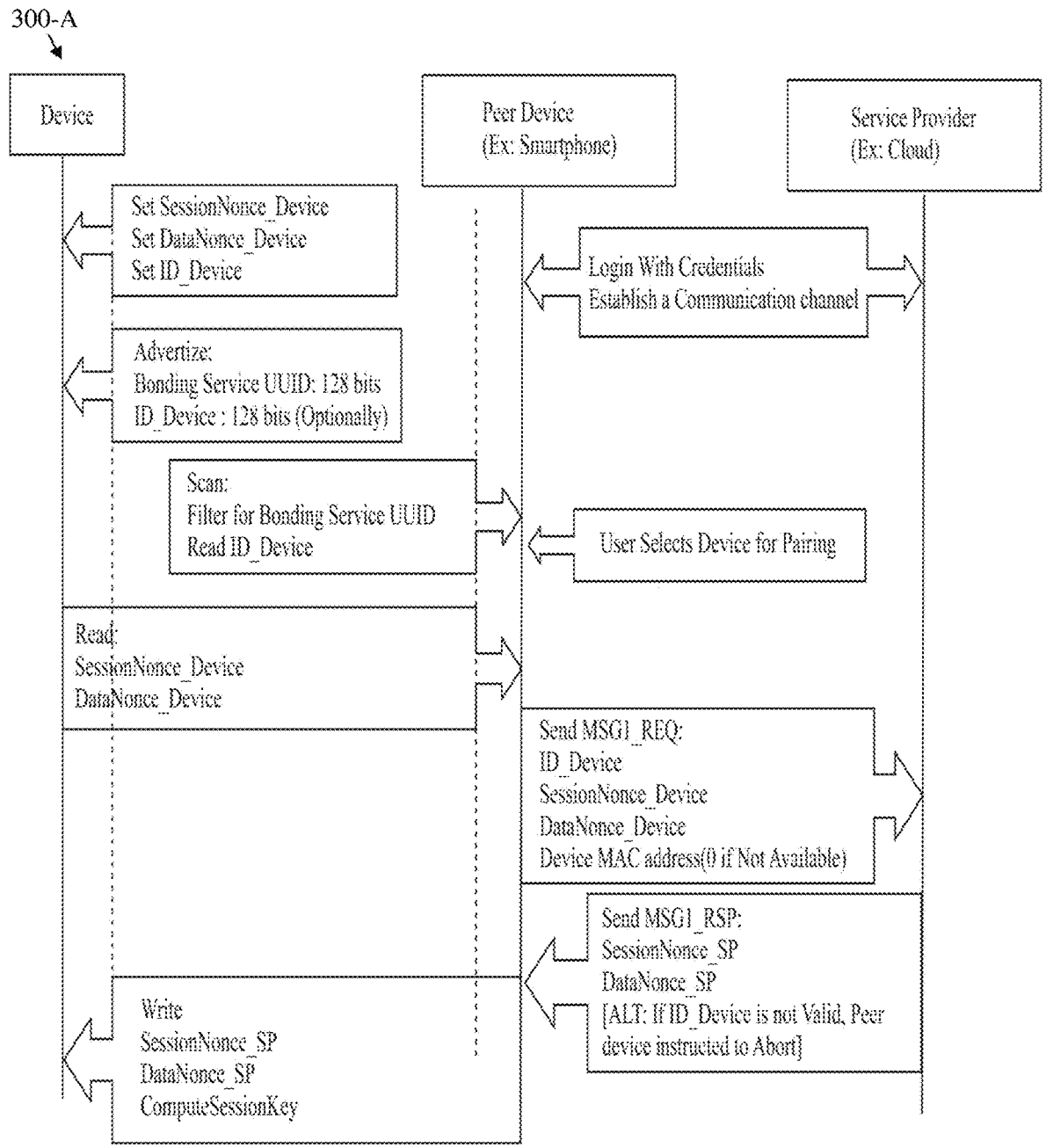
FIGURE 3-A

FIGURE 3-B
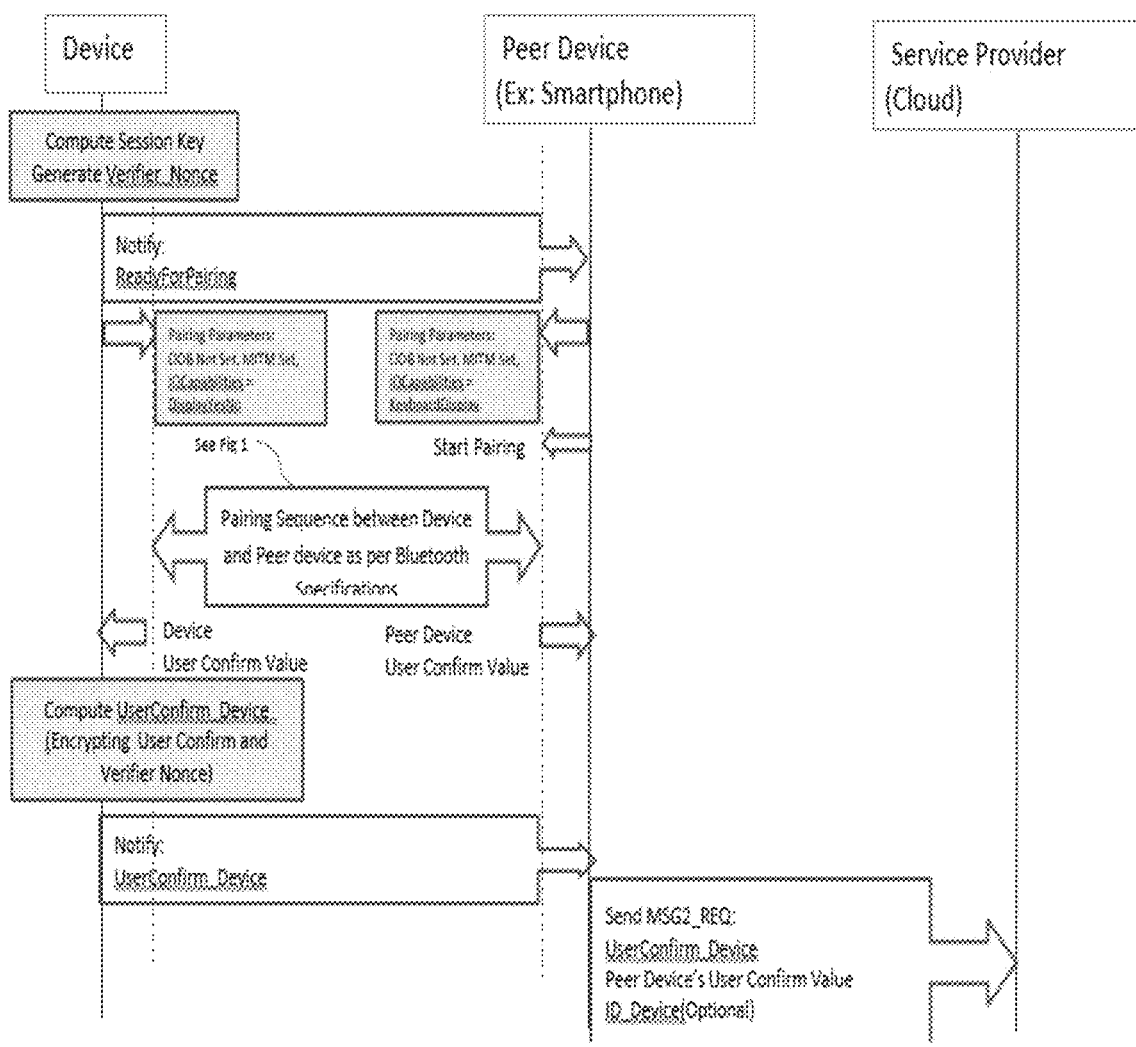

FIGURE 3-C
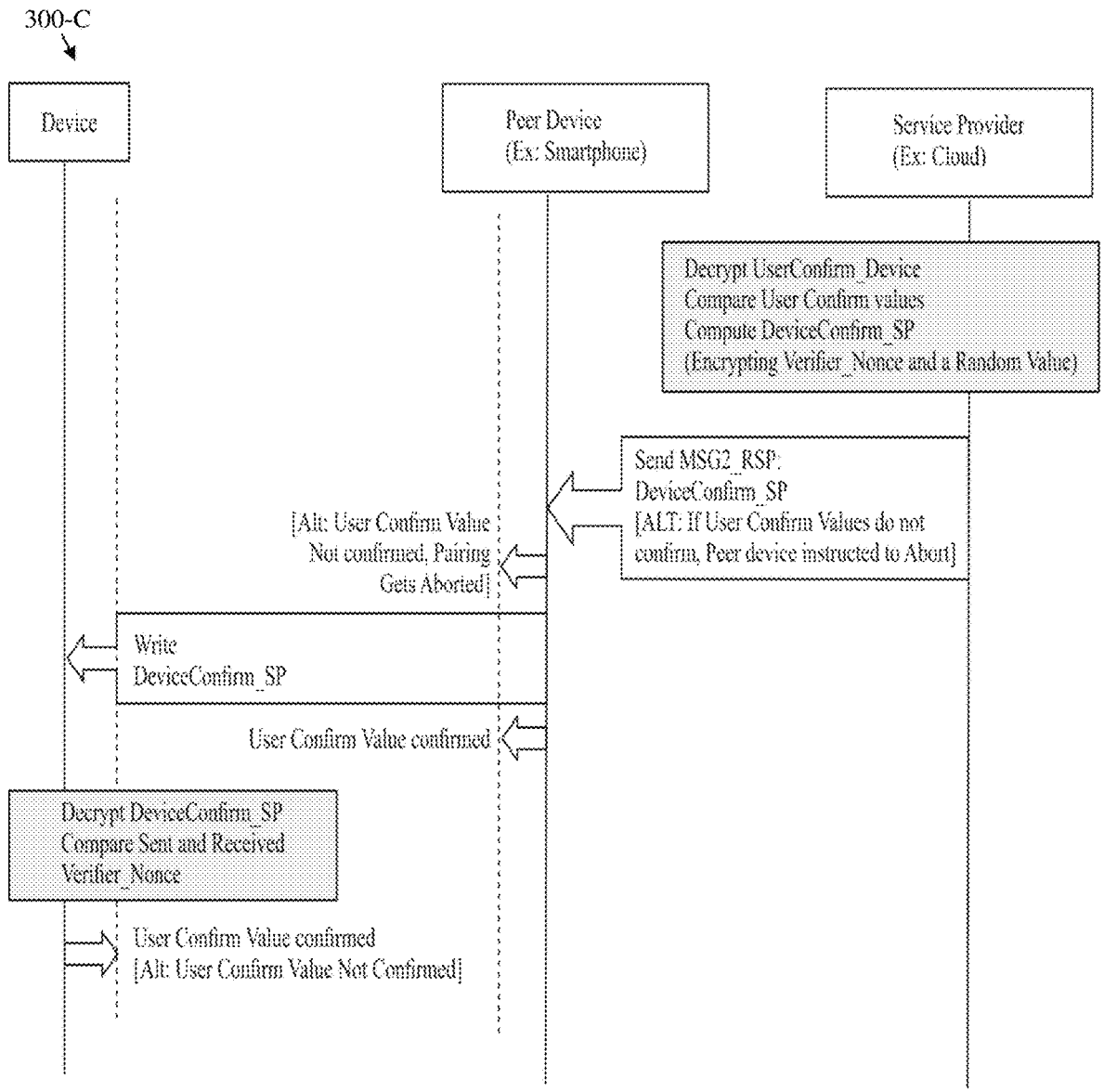

SYSTEM AND METHOD FOR SECURE CONNECTION OF HEADLESS BLUETOOTH DEVICE

PRIORITY DETAILS

The present application is based on, and claims priority from an Indian Application Number 202241015003 filed on 18 Mar. 2022, the disclosure of which is hereby incorporated by reference herein.

FIELD

The present disclosure generally relates to communication networks and, more particularly, to a system and a method for facilitating security in Bluetooth Communication.

BACKGROUND

A Bluetooth device can have several services and profiles hosted by it. The services hosted by a Bluetooth device can have several attributes or characteristics associated with them. These attributes can be 'written-to' or 'read-from' by devices connected to it. Individually, attributes or characteristics can be set to be accessed only with the process of authentication and authorization. The data present in the attribute or the characteristics needs to be encrypted during communication. In such case, the level of authentication required can also be set in advance, and the authentication and keys for encryption are established with pairing and bonding procedure.

Bluetooth specifications provide the details of the procedure for establishing pairing and bonding between two devices for secure connections. If any one of the devices does not have a display or a keyboard, or both, and does not have OoB communication mechanism (NFC) also, then the procedure falls back to Just Works mode which is susceptible to Man in the Middle (MITM) attacks.

The Bluetooth Low Energy (BLE) pairing and bonding procedure has three phases. BLE or Bluetooth LE is a variant of the Bluetooth wireless standard designed for low power consumption. In Phase I, pairing features are exchanged. Based on the pairing features that were exchanged, Phase II mode (also referred to as option) can be chosen. Phase II has four pairing and bonding options in BLE:
a) Just Works,
b) Numeric Comparison,
c) OoB, and
d) Passkey.

Using the options of secure connections of BLE which are currently available in Bluetooth 4.2 version and above, Numeric Comparison, OoB, and Passkey are considered secure (authenticated). However, the Just Works model for pairing and bonding options in BLE is not considered secure. The sequence as depicted in FIG. 1 (known in state of art) shows the normal sequence for Just Works and Numeric Comparison. The reasons for non-secure pairing and bonding options in BLE present in existing mechanisms applicable for headless devices is described in detail below.

For example, a mechanism as disclosed in published patent application number WO2016168409A1 uses a peer device to connect to the backend to get a public key of a device and further uses that key to decrypt the advertised data to identify the device. This mechanism seems to be dated and does not establish a secure means of Read and Write, nor does it integrate into Bluetooth specification mechanisms.

Another mechanism known in the state of art is Google Fast pair service where, devices (belonging to a Model ID) registered with Google are provided with a public/private key pair. Mobile devices(s), hereinafter referred to as mobile or mobiles, connecting to the device also generate their own public/private key pair. The mobile obtains the public key, of the device (Model ID) it intends to connect to, from Google. The mobile provides its public key to the device, so that both the mobile and the device can use the ECDH algorithm to generate AES key. This AES key is then used to share the user confirmed value with each other during the pairing process. For subsequent pairings, a pre-shared key is loaded onto the device by the mobile that can be used to share the user confirmed value. The problem with this mechanism is that the public key of the device is generic and maybe the same across all devices for a particular model. This public key may be obtained from Google or otherwise and any device should be able to pair with the device.

Another mechanism is disclosed in the published United States patent application numbered US20190281449A1. The method as disclosed therein, validates the public key of the device with an authentication server. The host also needs to authenticate the authentication server and confirm that the public key used in the pairing procedure is the same as the one certified by the authentication server.

Furthermore, the pairing process as disclosed in the published United States patent application numbered US20190281449A1 is implemented deep in the software layers and applications may not have access to the public keys exchanged during the process. In this method, only the host authenticates and ensures that it is connecting to the proper device. The method as disclosed in the referenced patent application, does not have a mechanism to ensure only authorized hosts and peer devices can connect to it.

There are several other mechanisms available currently that use OOB mechanisms such as Audio, Wi-Fi, etc., to support onboarding of devices. One of them is as disclosed in published United States patent application numbered US20110217950A1 that utilizes audio to let the user hear the user confirm value.

Another mechanism is disclosed in the paper titled "Towards Enhancing Just Works Model in Bluetooth Pairing" by Marwan Ali Albahar, et al, published in the International Journal on Information Technologies & Security, Volume 8, Issue 4, dated 2016 Dec. 1. This document addresses MITM attacks where an attacker forces the two devices to pair with it in a Just Works model. That is, the MITM attacker intervenes between the two devices, and projects NOINPUT_NOOUTPUT capability on both sides to force a Just Works model. The method as disclosed in the referenced paper addresses this attack, by an application that gets confirmation of IO capabilities. This type of attack may not be effective, as attributes and characteristics that require protection might not be accessible with Just Works.

Another mechanism of MITM attack is disclosed in the paper titled "Method Confusion Attack on Bluetooth Pairing". In this paper, the MITM attacker forces a Numeric comparison on one side of attack and passkey entry on the other side by projecting required IO capabilities on either side. It uses parameter obtained with numeric comparison model and uses it on the other side with passkey entry method. The end user is expected to look at the device and type the number on the mobile keyboard. This type of attack may not be applicable for headless devices, that is to say, devices that have neither a display nor a keyboard since and there is no display for the user to look at and enter using the keyboard.

Thus, there exists a need for a solution to overcome the drawbacks mentioned above associated with security in Bluetooth communication.

SUMMARY

This summary is provided to introduce a selection of concepts in simple manners that are further described in the detailed description of the disclosure. This summary is not intended to identify key or essential inventive concepts of the subject matter nor is it intended to determine the scope of the disclosure.

To overcome at least one of the problems in the state of the art, a system and method for enabling communication security and preventing unauthorized access to a headless Bluetooth device is needed. Headless Bluetooth devices do not have mechanisms for receiving user inputs and displaying outputs. A system and a method is needed for preventing MITM attacks, if any one of the devices does not have either a display or a keyboard or both, and the procedure for establishing pairing and bonding falls back to Just Works model. A system and a method are needed that overcome the problems mentioned above in the headless device and makes it suitable for numeric comparison model which is considered secure.

Briefly, according to an exemplary embodiment, a method for establishing a secure connection between a Bluetooth device and a peer device is disclosed. The method includes: a step of the Bluetooth device sending encrypted predefined first data to the peer device; a step of the peer device receiving the encrypted predefined first data and sending the encrypted predefined first data along with a predefined second data to a server; a step of the server receiving the encrypted predefined first data and the predefined second data from the peer device and processing them for authenticating the received data and, on successful authentication, sending the processed data to the peer device; a step of the peer device receiving the encrypted processed data and sending it to the Bluetooth device; and a step of the Bluetooth device receiving the encrypted processed data from the peer device and processing it for authenticating the received data and, on successful authentication, bonding and communicating securely with the peer device.

Briefly, according to an exemplary embodiment, a system for enabling a headless Bluetooth device for establishing a secure connection with a peer device is disclosed. The system includes the Bluetooth device configured for sending encrypted predefined first data to the peer device, the peer device configured for receiving the encrypted predefined first data and sending the encrypted predefined first data along with a predefined second data to a server, the server configured for receiving the encrypted predefined first data and the predefined second data from the peer device and processing them for authenticating the received data and, on successful authentication, sending the processed data to the peer device, the peer device configured for receiving the encrypted processed data and sending it to the Bluetooth device and the Bluetooth device configured for receiving the encrypted processed data from the peer device and processing it for authenticating the received data and, on successful authentication, bonding and communicating securely with the peer device.

The summary above is illustrative only and is not intended to be limiting in any way. In addition to the illustrative aspects, exemplary embodiments, and features described above, further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIGS. 3-A, 3-B, and 3-C(across three pages in continuation) illustrate a message sequence chart of interactions between a headless Bluetooth device, a peer device, and a server, in accordance with an embodiment of the present disclosure;

Figure 1:
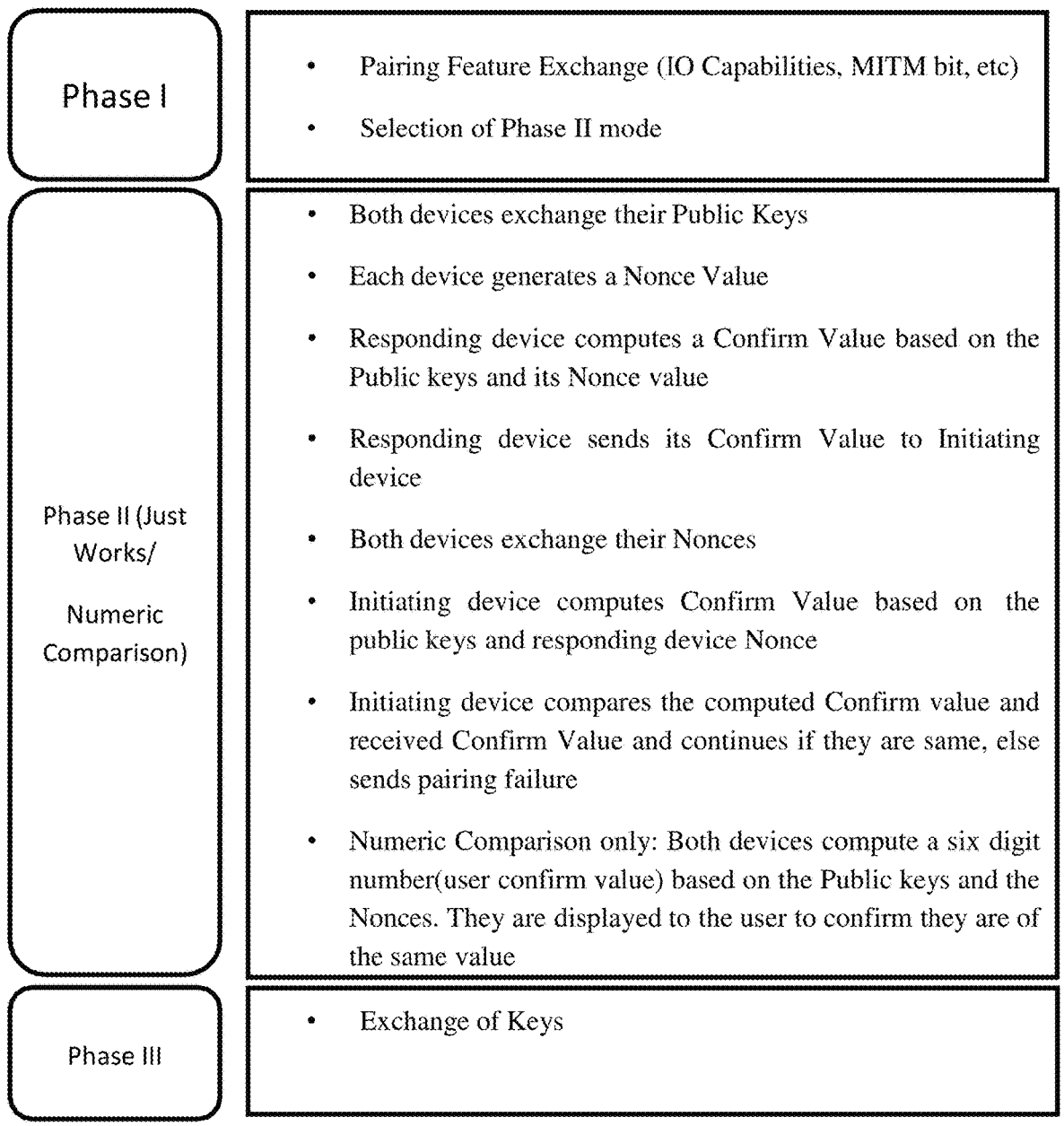
FIG. 1 is a block diagram of a method known in the state of the art illustrating a normal pairing and bonding sequence for numeric comparison model or just works model or both, between a Bluetooth device and a peer device.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION OF INVENTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Headless Bluetooth devices do not have any mechanisms for taking inputs and displaying outputs. Bluetooth specification provides the details for establishing pairing and bonding procedure between two devices for secure communications. If any one of the devices does not have a display or a keyboard, or both, and does not have OoB communication mechanism (NFC) also, then the procedure falls back to Just Works mode which is susceptible to Man in the Middle (MITM) attacks.

In Bluetooth pairing and bonding procedure, numeric comparison is considered secure. A headless Bluetooth device falls back to 'Just Works' model which is not secure (not authenticated). Just Works and Numeric Comparison are very similar except for an additional step in Numeric Comparison. In this additional step of Numeric Comparison, a computation is made on both sides deriving a six-digit number. This number is displayed on both sides for the user to confirm that the devices the user intends to pair is correct and the user confirms the same on both sides. Numeric comparison is considered secure, as the user verifies that this number is the same on both devices and confirms, whereas in Just Works, since there is no verification, it is not considered secure and is susceptible to MITM attacks Embodiments of the present disclosure particularly disclose a method of pairing and bonding between a headless Bluetooth device and a peer device and preventing MITM attacks. The method for establishing a secure connection between a Bluetooth device and a peer device is disclosed. The method includes: a step of the Bluetooth device sending encrypted predefined first data to the peer device; a step of the peer device receiving the encrypted predefined first data and sending the encrypted predefined first data along with a predefined second data to a server; a step of the server receiving the encrypted predefined first data and the predefined second data from the peer device and processing them for authenticating the received data and, on successful authentication, sending the processed data to the peer device; a step of the peer device receiving the encrypted processed data and sending it to the Bluetooth device; and a step of the Bluetooth device receiving the encrypted processed data from the peer device and processing it for authenticating the received data and, on successful authentication, bonding and communicating securely with the peer device.

In one embodiment, the headless Bluetooth device may be provided by a service provider. The service provider may provide an application that may be installed on a peer device, a smartphone, for example. The user may use the application to log into the service provider's service using their credentials. The application installed on the peer device, interacts with both the headless Bluetooth device and the server of the service provider for the pairing and bonding procedure. Both the headless Bluetooth device and the server share a master key.

During the pairing and bonding procedure, a user confirm value is generated at both the headless Bluetooth device and the peer device. In the Bluetooth devices with input means and a display the user is expected to check and confirm they are same. In a headless Bluetooth device, there is no display to show the value nor keys to confirm them.

To overcome this, the encrypted and authenticated user confirm value and a verifier nonce value are sent to a server through the peer device. The peer device also sends the user confirm value it has computed, to the server. The server verifies the user confirm values and sends back the verifier nonce value after encryption and authentication to the Bluetooth headless device.

Embodiments of the present disclosure disclose a mechanism to ensure the 'user confirm value' is verified, even though the Bluetooth device does not have a keyboard or buttons or display or any of them, for pairing and bonding with a peer device, and thereby, avoiding the MITM attack. It is to be noted that the embodiments of the present disclosure are applicable mainly for BLE based devices and Bluetooth Basic Radio and Enhanced Date rate (BR/EDR) based devices.

In some embodiments, the word 'Bluetooth device', 'BLE device, 'headless Bluetooth device', 'device' used in the description may have the same meaning and may be used interchangeably. In the descriptions below, the device initiating communication with a Bluetooth device is referred to as a peer device (for example, a smartphone), the responding device is the Headless Bluetooth device and more simply described as device. It is to be noted that the term bonding used herein refers to the exchange of long-term keys after pairing occurs and storing those keys for later use. Bonding is the creation of permanent security between two devices. Pairing is the mechanism that allows bonding to occur.

Embodiments of the present disclosure particularly disclose a method, wherein the headless Bluetooth device declares Display YESNO I/O Capability (though physically not available) in Phase I pairing feature exchange, so that numeric comparison is selected as part of the protocol. The YESNO I/O Capability specifies that the bluetooth device declares, it has a display, even though physically not available, so that numeric comparison model is selected as part of the protocol. The application installed on the peer device (provided by service provider) initiates pairing with the device. The application side declares Keyboard Display I/O Capability. A session key is generated using Advanced Encryption Standard—128 (AES-128) known in the state of art before each pairing procedure with data from both the headless Bluetooth device and the server. The 'user confirm value' (referred to as (a first user confirm value) and a 'random value' (referred to as verifier nonce) in the device are sent to the server (through the peer device) encrypted and authenticated with a session key derived from master key. The server decrypts the received value and makes a comparison with the user confirm value of the device. If they are found to be the same on comparison, pairing is allowed. Encrypted random (verifier nonce) value is sent back to the device by the server through the peer device, so that the device is assured of the peer device's authenticity.

Mutual authentication established through this procedure is also assumed to provide authorization. This authorization is for all services and for the lifetime of the Bluetooth device. If separate authorization is required for different services or authorization has to be restricted to a specific time period, then it has to be managed separately.

Embodiments of the present invention will be described below in detail with reference to the accompanying figures.

To further clarify advantages and features of the present invention, a more particular description of the invention will be rendered by reference to specific embodiments thereof, which is illustrated in the appended figures. It is to be appreciated that these figures depict only typical embodiments of the invention and are therefore not to be considered limiting of its scope. The invention will be described and explained with additional specificity and detail with the accompanying figures.

FIG. 1 is a block diagram of a sequence 100 known in the art illustrating a normal pairing and bonding sequence for numeric comparison model or Just Works model or both, between a Bluetooth device and a peer device. As mentioned above in the background section, using the options for Low Energy (LE) secure connections which are currently available in Bluetooth 4.2 version and above, Numeric Comparison, OOB, and Passkey are considered secure (authenticated). However, the Just Works pairing and bonding model in Bluetooth is not considered secure. The sequence as depicted in FIG. 1 (known in the state of art) shows the normal sequence for Just Works model and Numeric Comparison model. The non-secure pairing and bonding options present in the existing Bluetooth Just Works model, are overcome using methods of pairing and bonding described in detail below in the embodiments of the present disclosure.

Figure 2:
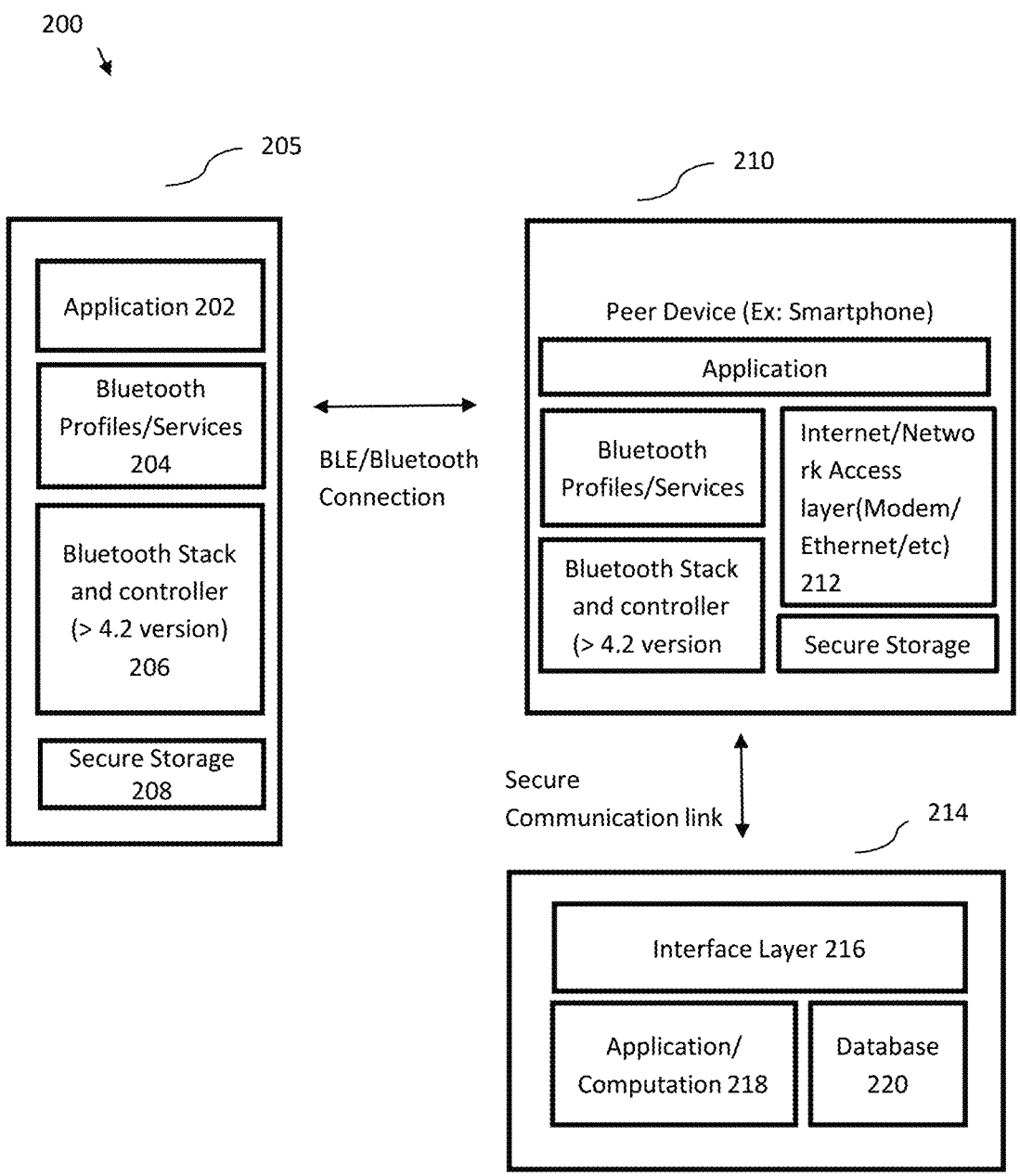
FIG. 2 is a block diagram illustrating a system comprising the components involved in the pairing and bonding sequence for numeric comparison model or just works model or both, between a headless Bluetooth device and a peer device, in accordance with an embodiment of the present disclosure.

FIG. 2 is a block diagram of a system 200 illustrating components involved in pairing and bonding sequence for numeric comparison model or just works model or both, between a headless Bluetooth device 205 and a peer device 210. FIG. 2 shows a high-level block diagram of the components involved in pairing and bonding sequence for numeric comparison model or just works model or both, between the headless Bluetooth device 205 and the peer device 210.

The device 205 is a headless Bluetooth device that does not have other OoB mechanisms to ensure secure communications. This headless Bluetooth device 205 is hereinafter referred to as device 205. The device 205 has services or profiles or characteristics which require secure communication to be accessed.

The device 205 comprises application 202, Bluetooth profiles and services 204 existing in the device 205, a Bluetooth stack and controller 206 and a secure storage unit 208.

The block 202 represents an application. The application includes a process for ensuring a secure connection. The process may be described from the perspective of a processor that executes computer readable instructions stored in a memory, to which the processor is communicatively coupled, to carry out the functions of the modules disclosed in the present disclosure for ensuring a secure connection between the headless Bluetooth device 205 and a peer device 210. It is to be noted, that the block 202 also includes other processes known in the state of art, apart from another device specific application.

The block 204 represents a set of profiles or services or both in the device 205. In one embodiment, the services shown in block 204, disclose the services as proposed by the embodiments of the present disclosure. It is to be noted, that the block 204 also includes a set of profiles or services known in the state of art and implemented by the embodiments of the present disclosure.

The block 206 represents the Bluetooth stack and controller. The Bluetooth stack and controller are configured to support at least version 4.2 of Bluetooth specifications. The block 208 represents the secure storage to store the master key of the device 205.

The peer device 210 as shown in FIG. 2 may be a smartphone, for example, and may be used to establish a connection with the device 205 and Read/Write characteristics on the device 205. The peer device 210 also has Bluetooth profiles, stack, and a secure storage area. The peer device 210 additionally has an internet or network access layer 212 through which it connects to the server 214 or cloud 214.

FIG. 2 also shows server 214 or cloud 214 which further shows blocks for interface 216 with peer devices 210, a computation block 218 for handling communication from peer devices 210 and supporting pairing and bonding or both apart from other functionality, a database 220 containing ID_device, master key of all devices (for example, the Bluetooth device 205). It is to be noted that, the ID number or identification of a device is represented by ID_device. The device 205 has a proprietary Bluetooth service for pairing and bonding, referred herein with Bonding Service Universally Unique Identifier (UUID).

The device 205 is provided by a service provider. The service provider not only provides the Bluetooth devices, but they also provide this server mediated pairing, bonding, and authentication service through the server 214. Further, a true owner of the Bluetooth devices 205 is provided an application for one or more peer devices 210 so that MITM attacks are not possible, as described in this disclosure.

It is to be noted that, the service provider provides a plurality of headless Bluetooth devices, wherein each device (for example, the device 205 as shown in FIG. 2) has an ID number. The Bonding Service UUID and optionally Individual ID or serial number of the device 205 is advertised. For each device 205, provided by the service provider, a unique master Key is generated by the server 214. To clarify, advertising optionally Individual ID or serial number, herein means, that the devices 205 can advertise information, which peer devices 210 can scan and obtain without connecting. The information that is advertised is Bonding service UUID, however, advertising ID_device or serial number of the device 205, or both, is optional.

This master key generated, is specific and unique to each device 205, and is stored in both, the device 205 and at the service provider's server 214 securely. The service provider's server 214 has the master key and the ID number of each device 205. It is to be noted, that the ID number is also referred to as serial number. The master key generated is a Uniform Random Key.

An application is provided by the server 214 for the device 205 which is installed on the peer device 210. The peer device 210 logs into server 214 associated with the service provider, with the user credentials provided by the user and establishes a secure communication channel with it. This application, when desired by the user, scans for Bluetooth devices 205) within communication range, and presents to the user, all available Bluetooth devices that are advertising the service provider's Bonding Service UUID. The user selects the device 205 for initiating pairing and bonding procedure.

At the device 205 side, a proprietary Bluetooth service with its UUID (Bonding Service) is made available. The service may have the following characteristics.

SessionNonce_Device: This is a 64 bits unsigned number, read-only, No Authentication, No Authorization Required. This number is used for session key derivation along with SessionNonce_SP. This number is generated for each pairing attempt and loaded into the characteristic. The session key generated is used in the AES CCM (Advanced Encryption Standard Cipher block chaining) algorithm to transfer user confirm value along with a verifier nonce.

The details associated with AES CCM algorithm are explained in detail below.

AES_CCM algorithm: Counter with CBC-MAC (CCM) is a generic authenticated encryption, block cipher mode. CCM is defined for use with 128-bit block ciphers, such as the Advanced Encryption Standard (AES). When used with AES, it is defined as AES-CCM. This scheme provides both Authentication and Confidentiality. CCM mode combines the well-known CBC-MAC with the well-known counter mode of encryption. These two primitives are applied in an "authenticate-then-encrypt" manner, that is, CBC-MAC is first computed on the message to obtain a tag "t"; the message and the tag are then encrypted using counter mode.

In CCM mode there are two parameter choices. The first choice is M, the size of the authentication field. Valid values are 4, 6, 8, 10, 12, 14, and 16 octets. The second choice is L, the size of the length field. This value requires a trade-off between the maximum message size and the size of the Nonce. Different applications require different trade-offs, so L is a parameter. Valid values of L range between 2 octets and 8 octets, Nonce length shall be 15-L. In the current embodiment of the present disclosure, the value of M is taken as 4, L is taken as 2 so Nonce length shall be 13. Other embodiments with different values for M and L are also possible. It is to be noted that, the size of the numbers mentioned in the description below are exemplary and not limited only to those mentioned, but numbers of other size may also be used to achieve the intended purpose.

SessionNonce_SP: This is 64 bits unsigned number, write-only, No Authentication, No Authorization Required. This number is written into by the peer device 210. The peer device 210 obtains this number from server 214. This number is written into by the peer device 210, before any pairing attempt. This, along with SessionNonce_Device is used to derive session key. The session key generated is used in the AES CCM algorithm to transfer user confirm value along with verifier nonce.

DataNonce_Device: This is of 32 bits number, read-only, No Authentication, No Authorization Required. This number is used as a nonce value in the AES CCM Algorithm along with DataNonce_SP. This number is generated and loaded initially by the device 205 and changed after each pairing attempt.

DataNonce_SP: This is of 64 bits number, write-only, No Authentication, No Authorization Required. This number is written into by the peer device 210. The peer device 210 obtains this number from server 214. This is written before any pairing attempt. This along with DataNonce_Device is used as nonce as part of AES CCM algorithm.

UserConfirm_Device: This contains encrypted value of user confirm value and a verifier nonce. Along with these values, the MAC generated by AES-CCM algorithm may also be present. User confirm value may be a 48 bit string, Verifier Nonce is a 32-bit number and the value of MAC may be of 32 bits, so totally 112 bits. This is set for notification, no authentication nor authorization required. The device 205 writes into this characteristic after receiving user confirm value as part of the pairing procedure. The user confirm value along with verifier nonce (a random value) may be encrypted using AES-CCM (RFC 3610).

DeviceConfirm_SP: This contains encrypted value of VerifierNonce (Same value as sent by Device) written into this characteristic by the peer device 210, and a 32-bit random number. Along with these values, the MAC generated by AES-CCM algorithm may also be present. Totally 96 bits. This may be set for write-only, No Authentication, No Authorization Required. This is used to validate the server 214 as encrypted verifier nonce sent by device 205 can only be decrypted by server 214.

ID_Device: This is of 128 bits number read-only, No Authentication, No Authorization required. This is loaded initially by the device 205 based on its stored value and won't be changed. This optionally may also be advertised. This also can be sent by the peer device 210 (smartphone) to server 214 to validate the device 205.

ComputeSessionKey: This may be an 8-bit number, write-only, No Authentication, No Authorization required. This is a signal set by the peer device 210 after SessionNonce_Device and DataNonce_device is read and SessionNonce_SP and DataNonce_SP are written into. After a value is written into this, the device starts computing the Session Key and also generates a Verifier_Nonce. This is used to ensure all the values required for session key are in place before computation.

ReadyForPairing: This is an 8-bit number, Notification, No Authentication, No Authorization required. This is set by the device 205 after computing session key and generating Verifier_Nonce. This is used to indicate the peer device 210 after it has asked the device to compute session key (through setting ComputeSessionKey) that the device has computed the session key and is ready for pairing.

All UUIDs (Service and Characteristic) are of 128-bit length.

Before pairing and bonding procedure starts, the device 205 may load the SessionNonce_Device and DataNonce_Device characteristic with their values. The server 214 through the peer device 210 loads the SessionNonce_SP and DataNonce_SP characteristics with its values and reads in the device's values. The peer device 210 may then set ComputeSessionKey.

Both device 205 and the server 214 may derive SessionKey. SessionKey is derived by using AES-128, master key may be used as the key and SessionNonce_Device II SessionNonce_SP as the data, output generated is used as SessionKey.

Once SessionKey is derived and Verifier_Nonce is generated at the device, it notifies the peer device 210 by writing into ReadyForPairing.

Both the device 205 and the server 214 may generate a new set of SessionNonce_Device, SessionNonce_SP, DataNonce_Device and DataNonce_SP values for each pairing and bonding attempt. After the peer device 210 gets notified by ReadyForPairing, it initiates the pairing and bonding procedure. During pairing and bonding, after user confirm value is obtained, the device 205 applies the AES-CCM algorithm (RFC 3610) as below on the User Confirm value and Verifier_Nonce.

AES-CCM: Parameters M (MAC length) 32 bits, L (Length Field) 16 bits
CCM Nonce: Totally 104 bits:
00 (8 bits)|DataNonce_Device (32 bits)|DataNonce_SP (64 bits)
No Additional Data:
Ex: DataNonce_Device=0x12345678
DataNonce_SP=0xAABBCCDDEEFF1122
Key: SessionKey
UserData: User Confirm||Verfier_Nonce (48 bits+32 bits)
Encrypted user confirm value and Verfier_Nonce value is loaded along with the generated MAC into the characteristic UserConfirm_Device. This gets notified to the peer device 210.

The peer device 210 sends the received encrypted user confirm and Verfier_Nonce value (UserConfirm_Device) along with MAC, to the server 214 along with its user confirm value and ID of the device 205. The server 214 uses the session key to decrypt the message, then it computes the MAC on the decrypted message and compares the received MAC with the computed value. If the computed MAC value and received value differs, it sends a failure to peer device 210. Next it compares the user confirm value of the device 205 and the peer device 210, if it does not match, it sends failure to the peer device 210. If they match, AES-CCM is applied to the Verfier_Nonce value received along with another random value generating an encrypted Verifier Nonce, random value along with MAC. This encrypted value is sent to the peer device 210. AES-CCM parameters used are as below.

AES-CCM: Parameters M (MAC length) 32 bits, L (Length Field) 16 bits
CCM Nonce: Totally 104 bits:
FF (8 bits)|DataNonce_Device(32 bits)|DataNonce_SP (64 bits)
No Additional Data:
Ex: DataNonce_Device=0x12345678
DataNonce_SP=0xAABBCCDDEEFF1122
Key: SessionKey
User Data: Verifer_Nonce||Random_Data(32 bits)

The peer device 210 sends a pairing failure message if it receives a failure message from the server 214, else it writes the encrypted verifier nonce value, random value, and the MAC value to DeviceConfirm_SP. It also sends a pairing confirm message.

The device 205 verifies the received info by decrypting DeviceConfirm_SP and computing the MAC value. If the computed MAC value and received MAC values do not match, pairing failure message is sent. If the sent Verifer_Nonce and received Verifier_Nonce value are not the same, a pairing failure message is sent. If the Device-Confirm_SP value is not received within a specific time a pairing failure is sent.

MITM Attack Analysis is Described in Detail Below:

The peer device 210 view (MITM attacker taking the role of the Device) of the method: Since the MITM attacker does not have the master key, the information sent by it is rejected by the server 214 and the peer device 210 sends a pairing failure message.

The Bluetooth device 205 view (MITM attacker taking role of peer device 210) of the method: Since the MITM attacker does not have the master key, it will not be able to decrypt the packet that contains the User confirm and Verifier_Nonce value. The device 205 expects the Verifier_Nonce value back along with a Random value encrypted. Since the MITM attacker is not able to provide this, it leads to the failure of Pairing and Bonding.

Other embodiments of the present disclosure are as explained below:

The application installed on the peer device 210 may determine the device 205 is from the service provider based on the local name of the device 205. The application can then read in the Individual ID or Serial number in the service with the service provider's UUID.

As mentioned earlier, the master key generated is a Uniform Random Key. It is to be noted that other mechanisms may also be used to generate master key, such as Argon 2™ and is not only limited to Uniform Random Key. Other authentication and encryption mechanisms like Galois/Counter Mode (GCM) known in the state of art may be used. Any other suitable methods known in the field may be used for authentication and encryption and is not limited to only GCM as mentioned herein. Further to the above, it is to be noted that separate encryption and authentication mechanisms can be used based on symmetric and asymmetric keys. Different symmetric key mechanisms may be used to encrypt and MAC such as HMAC can be used to for authentication. Use of all such variations and choice of encryption methods or protocols along with the method disclosed in this disclosure fall under the scope of this disclosure.

Furthermore, asymmetric keys may be used for the encryption. In one example, the algorithms known in the state of art such as ECDH can be used. Asymmetric keys may be used for the authentication. In another example, the algorithms known in the state of art such as ECDSA can be used. Use of all such variations and choice of encryption methods or protocols along with the method disclosed in this disclosure fall under the scope of this disclosure.

The device 205 accepts pairing attempt by peer devices 210 with Keyboard and Display I/O capability only and peer device 210 proceeds with pairing with device 205 only if it has DisplayYesNo I/O capability. This should result in numeric comparison model only.

The device 205 may have its public key used in the BLE Pairing protocol printed as a QR code or Bar code or plain text for the peer device 210 to scan. The peer device 210 can compare the public key received Over-The-Air (OTA) as per the Bluetooth Pairing protocol and the printed value and continue only if they match else reject the pairing If the extra step is analyzed, in the Numeric comparison, the computation is based on the public keys of both the devices and the nonces that were exchanged during bonding process. A MITM attacker may have inserted his key material and if the verification step is ignored, the attack may be successful So, if it is confirmed that the public key, that is being used does actually belong to the device it intends to connect to, then this may be equivalent to the Numeric comparison step. Device 205 can display its public key as a QR Code or bar Code or Plain text or combination of the mentioned, so that the peer device 210 can compare with the actual value received OTA. The peer device 210 can also send the public key received OTA to server 214 for validation. The peer device 210 can also send its public key to server 214, so that it can be encrypted and authenticated by the server 214 and sent to device 205 for comparison The peer device 210 may also send the public key received OTA to the server 214 for it to confirm that it belongs to the device.

The peer device 210 may also send its public key to the server 214, so that the same can also be authenticated and encrypted and sent back to the device 205 via the peer device 210. The device 205 can compare the public key that it received OTA and the one sent by the server 214 for validating that it is not communicating with an MITM attacker.

Device View (MITM attacker as Peer device 210) of the method: MITM attacker may not be able to send its public key encrypted and authenticated with the service provider's keys hence the device can reject the pairing attempt.

Peer device view (MITM attacker as device) of the method: QR code or bar code or plain text or a combination of them, on the device will not match that received OTA, hence the peer device 210 can reject the pairing attempt. Even if MITM attacker were to put his own public device label on the device, the server 214 may reject this when the peer device 210 sends the public key received OTA for validation.

FIG. 3-A-B-C(across three pages in continuation) illustrates a message sequence chart of interactions between a headless Bluetooth device, a peer device 210 and a server 214, in accordance with an embodiment of the present disclosure. The peer device 210 may be for example, a smartphone, the server 214 may be a cloud server 214. It is to be noted that the sequence shown in FIG. 3 is not binding and changes in the sequence may be initiated by the headless Bluetooth device 205 to ensure pairing and all such variations are within the purview of this disclosure.

The mechanism for establishing secure communication between a headless Bluetooth device 205, and a peer device 210 is based on a message sequence chart of interactions between a headless Bluetooth device, a peer device 210, and a server 214.

The headless Bluetooth device 205 does not have a display or keyboard OR NFC (for OoB) capability and in normal course may have been forced to use 'Just Works' model of pairing and bonding. The peer device 210 containing an application may pair and bond with the device 205. The server 214 which may interact with the peer device 210 application and through it with the device to assist in secure pairing and bonding.

In one embodiment, the authentication established using LE Secure connection procedure (Numeric Comparison model) is assumed to also provide authorization. For accessing the services following functions are performed:
 i. Device may store a master key, ID number or identification represented by ID_device in a secure manner. The device may declare DisplayYESNO I/O Capability (though physically not available) in Phase I pairing feature exchange, so that numeric comparison is selected as part of the Bluetooth pairing and bonding protocol.
 ii. Device 205 may apart from the Bluetooth services that it may provide to support its functionality, include a pairing and bonding service functionality. The pairing and bonding service functionality may have its own service UUID. The pairing and bonding service functionality may have the following characteristics: It is to be noted that, the size of the characteristics as mentioned in the below paragraphs are not limited only to those mentioned herein, but the characteristics of other size can also be used.
   a. SessionNonce_Device: This may be 64 bits unsigned value, read-only, No Authentication, No Authorization Required. This number is used for session key derivation along with SessionNonce_SP. This number is generated and loaded initially by the device and generated and changed after each pairing attempt.
   b. SessionNonce_SP: This may be 64 bits unsigned value, write-only, No Authentication, No Authorization Required. This number is written into by the peer device 210. The peer device 210 obtains this number from server 214. This is written into before any pairing attempt. This along with SessionNonce_Device is used to derive session key.
   c. DataNonce_Device: This may be 32 bits value, read-only, No Authentication, No Authorization Required. This number is used as a CCM Nonce value from the device side and is used along with DataNonce_SP. This number is loaded initially by the device and changed after each pairing attempt.
   d. DataNonce_SP: This may be 64 bits value, write-only, No Authentication, No Authorization Required. This number is written into by the peer device 210. The peer device 210 obtains this number from server 214. This is written before any pairing attempt. This along with DataNonce_Device is used as part of CCM Nonce.
   e. UserConfirm_Device: This may contain encrypted and Authenticated value of a User Confirm Value and a Verifier_Nonce. Along with this MAC generated by AES-CCM algorithm may be present. User confirm value may be a 48 bits string, Verifier_Nonce may be a 32 bit value. MAC may be 32 bits. Totally 112 bits. This may be set for Notification, No Authentication nor authorization required. The device writes into this characteristic after receiving User Confirm Value as part of the pairing procedure. The user confirm value along with Verifier_Nonce (a Random Value) may be encrypted and authenticated using AES-CCM (RFC 3610).
   f. DeviceConfirm_SP: This may contain encrypted and Authenticated value of Verifier_Nonce (Same value as sent by Device) and a random value, along with the MAC value. This value is written into this characteristic by the peer device 210. Verifier Nonce is 32 bit and a 32 bit random value, MAC is 32 bit value. Totally 96 bit. This may be set for write-only, No Authentication nor authorization required.
   g. ID_Device: This may be 128 bits value. read-only, No Authentication, nor Authorization required. This is loaded initially by the device based on its stored value and won't be changed.
   h. ComputeSessionKey: This may be a 8 bit value, write-only, No Authentication Nor Authorization required. This is a signal set by the peer device 210 after SessionNonce_Device and DataNonce_device are read and SessionNonce_SP and DataNonce_SP are written into. After a value is written into this, the device starts computing the Session Key and also generates a Verifier_Nonce.
   i. ReadyForPairing: This may be a 8 bit vale, Notification, No Authentication nor Authorization required. This is set by the device after computing session key and generating Verifer_Nonce
 iii. The device 205 may advertise pairing and bonding service UUID. It may accept incoming connections. Device may load in values to SessionNonce_Device and DataNonce_Device. It may wait for ComputeSessionKey to be written into. Once this characteristic is written to by the peer device 210, it may take the values of SessionNonce_Device and SessionNonce_SP and compute SessionKey as follows: Use AES128 Block algorithm with SessionNonce_Device∥SessionNonce_SP as data, master key as Key. Output generated used as SessionKey. Further it may generate Verifier_Nonce (32 bits random data) and signal ReadyForPairing.

iv. After the peer device 210 has started pairing, the device's Bluetooth 205 controller may generate user confirm value (a 6 digit number). In normal numeric comparison model this has to be displayed to the user and user's confirmation obtained. In this case this value along with Verifier_Nonce is encrypted using AES-CCM (RFC3610). The parameters used are as follows:
AES-CCM: Parameters M (MAC length) 32 bits, L (Length Field) 16 bits
CCM Nonce: Totally 104 bits:
00 (8 bits)|DataNonce_Device(32 bits)|DataNonce_SP (64 bits)
No Additional Data:
Ex: DataNonce_Device=0x12345678
DataNonce_SP=0xAABBCCDDEEFF1122
Key: SessionKey
UserData: User Confirm II Verifier_Nonce (48 bits+32 bits)

v. The encrypted UserData along with MAC generated (32 bits) is loaded into UserConfirm_Device and the device shall wait for DeviceConfirm_SP to be written into.

vi. After a value is written into DeviceConfirm_SP by the peer device 210, the device may decrypt them using AES-CCM. Parameters used are:
AES-CCM: Parameters M (MAC length) 32 bits, L (Length Field) 16 bits
CCM Nonce: Totally 104 bits:
FF (8 bits)|DataNonce_Device(32 bits)|DataNonce_SP (64 bits)
No Additional Data:
Ex: DataNonce_Device=0x12345678
DataNonce_SP=0xAABBCCDDEEFF1122
Key: SessionKey
User Data: Verifer_Nonce||Random_Data(32 bits) ||MAC vii. Device 205 verifies the received info by decrypting DeviceConfirm_SP and computing the MAC value. If the computed MAC value and received MAC value does not match, Pairing Failure message is sent. If the sent Verifier_Nonce and received Verifier_Nonce value are same, it may accept the User Confirm Value sent by the controller, else it may send Failure(No) to the Bluetooth controller.

viii. Peer device 210 may contain an application provided by the device provider (referred to as service provider). This application may establish a secure connection with the service provider's server 214. The application may also provide other device specific functionality. When the user initiates pairing and bonding connection, it may search for a devices advertising pairing and bonding service UUID. The application may present to the user devices advertising the same. After the user selects the device, it may connect to that specific device and go through a procedure to pair and bond with the device.

ix. It may read in the SessionNonce_Device, DataNonce_Device, ID_Device along with MAC address (if available, else 0 is sent) to the server 214 over the secure channel. If the ID_device is not valid or does not match the MAC address (if present), then the server 214 may communicate to peer device 210 to abort the connection, else it may provide data for SessionNonce_SP and DataNonce_SP to be loaded into Device. The peer device 210 after loading these, may write into ComputeSessionKey and wait for a notification from device's ReadyForPairing.

x. After receiving ReadyForPairing notification, Peer device 210 may initiate pairing and bonding with Device. When User Confirm value is received, it may wait for UserConfirm_Device from the device, it may send this value along with the User Confirm value it had received over the secure communication channel to the server 214. The server 214 may decrypt and authenticate UserConfirm_Device and compare the User confirm value of Device and Peer device 210. If they match it may send Success along with encrypted Verifier_Nonce along with a Random value to the peer device 210. The peer device 210 may load this to DeviceConfirm_SP in the device and confirm to the Bluetooth controller. If they do not match, the server 214 may send failure and the peer device 210 may send failure to the Bluetooth controller.

xi. Server 214 may interact with the application in the peer device 210. It may establish a secure communication with the peer application. Server 214 might have several parallel sessions with different peer devices 210, but only one session at a time with a particular peer device 210 xii. Server provider during a session with peer device 210 might support additional functionality other than supporting pairing and bonding. For the pairing and bonding functionality, it may support in the following mechanisms.
1. Server 214 may act on the Peer device 210.MSG_REQ1 containing SessionNonce_Device, DataNonce_Device, ID_Device and MAC Address as follows:
ID_Device is checked against its internal database. If MAC address is provided that is also checked against internal database. If they are not available or do not match, a MSG_RSP1 is sent rejecting the device. If they are available and match, SessionNonce_SP and DataNonce_SP is generated and MSG_RSP1 is sent to the peer device 210 with these values. Further a SessionKey is computed as follows: Use AES128 Block algorithm with SessionNonce_Device II SessionNonce_SP as data, master key (specific to ID_Device) as Key. Output generated used as SessionKey.
2. Server 214 may act on the Peer device 210.MSG_REQ2 containing User Confirm Value of the peer device 210, encrypted value of User Confirm of device and Verifier Nonce and MAC as follows:
The encrypted value is decrypted as per AES-CCM (RFC3610) algorithm. The parameters used are:
AES-CCM: Parameters M (MAC length) 32 bits, L (Length Field)
16 bits
CCM Nonce: Totally 104 bits:
00 (8 bits|) DataNonce_Device(32 bits)|DataNonce_SP(64 bits)
No Additional Data:
Ex: DataNonce_Device=0x12345678
DataNonce_SP=0xAABBCCDDEEFF1122
Key: SessionKey
Once decrypted, MAC is computed again with the decrypted User Confirm value and verifier nonce and compared with the received MAC. If they match, User Confirm value of the device is compared with the User Confirm value of the peer device 210. If either MAC does not match, or User Confirm Value does not match, MSG_RSP2 is sent rejecting the device. If both match, Verifier_Nonce and another Random value(32 bits) is encrypted using AES-CCM with following parameters and sent as MSG_RSP2.

AES-CCM: Parameters M (MAC length) 32 bits, L (Length Field)
16 bits
CCM Nonce: Totally 104 bits:
FF (8 bits)|DataNonce_Device(32 bits)|DataNonce_SP(64 bits)
No Additional Data:
Ex: DataNonce_Device=0x12345678
DataNonce_SP=0xAABBCCDDEEFF1122
Key: SessionKey
User Data: Verifier_Nonce II Random_Data(32 bits).

A manner in which pairing, and bonding is initiated between the Bluetooth device 205 and the peer device 210, using server 214 mediated process, for establishing a secure connection between the Bluetooth device 205 and the peer device 210 is described in further detail below.

In some embodiments, the word 'serial number', 'Individual ID', 'ID_device', "ID number" of the Bluetooth device 205 used in the description may reflect the same meaning and may be used interchangeably. The term 'Bonding Service Universally Unique Identifier UUID is the device's proprietary Bluetooth service for pairing and bonding.

In some embodiments, the word Verifier_Nonce and the verifier nonce used in the description may reflect the same meaning and may be used interchangeably. It is to be noted that the 'user confirm value' generated by the Bluetooth device's 205 controller is referred to as a 'first user confirm value'. It is to be noted that the 'user confirm value' generated by the peer device 210 is referred to as a 'second user confirm value'. It is to be noted that the encrypted UserData along with MAC generated (32 bits) is referred to as predefined first data.

Figure 4:
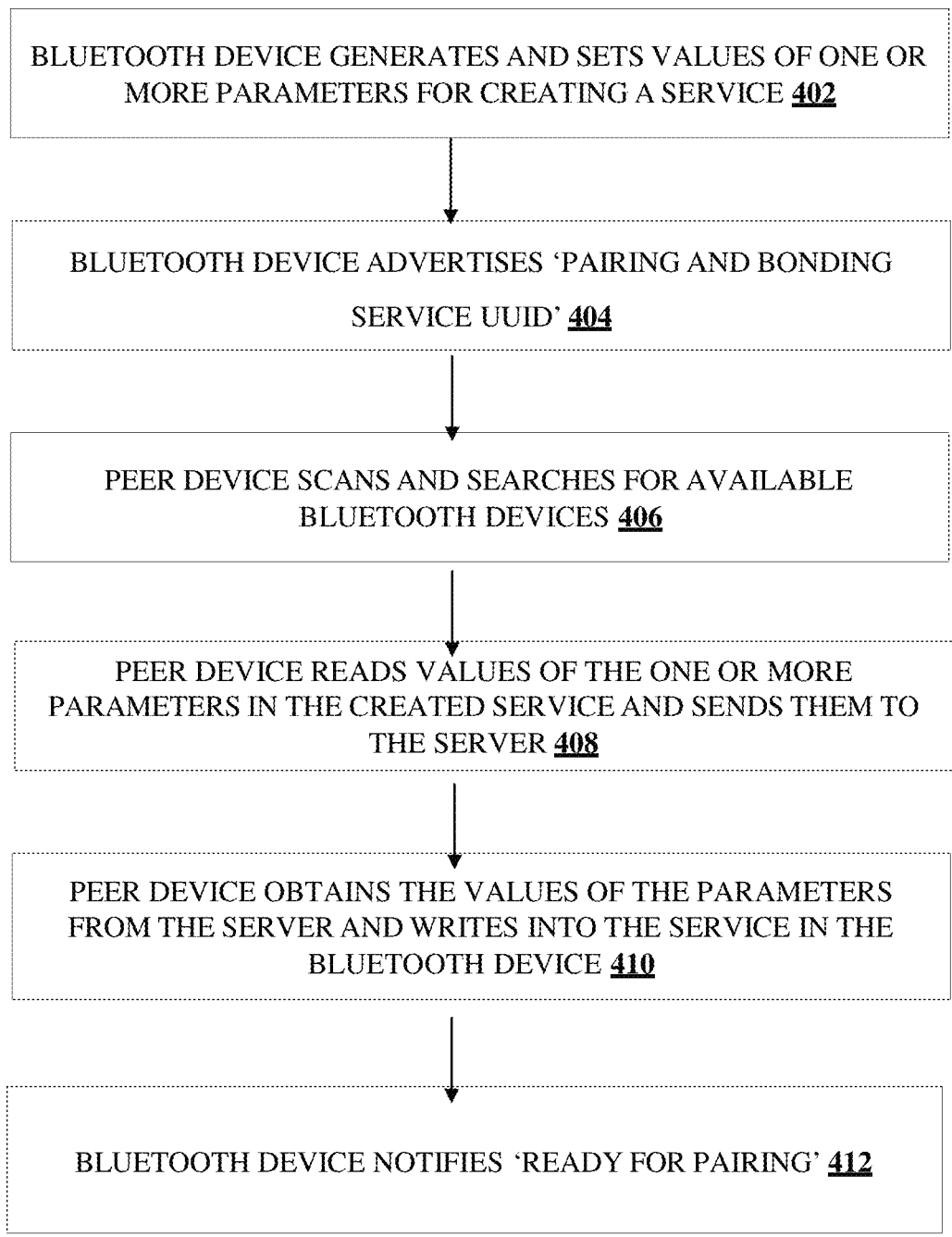
FIG. 4 is a flow chart illustrating a method for initiating pairing and bonding between a Bluetooth device and the peer device.

FIG. 4 is a flow chart illustrating a method 400 for initiating pairing and bonding between the Bluetooth device 205 and the peer device 210. It is to be noted that the steps as performed by the method 400 are executed prior to initiation of Bluetooth stack pairing procedure by peer device. the steps performed by the method 500 are subsequent to Bluetooth device and pairing device obtaining the user confirm value from Bluetooth stack. The steps of the method 400 are carried out for "initiating" data transfer and accepting incoming connections for establishing a secure connection between a Bluetooth device 205 and a peer device 210. FIG. 4 may be described from the perspective of a processor that is configured to execute computer-readable instructions to carry out the functionalities of the Bluetooth device 205, the peer device 210, and the server 214 of FIG. 2.

In particular, the steps as described in FIG. 4 may be described from the perspective of a processor that executes computer readable instructions stored in a memory, to which the processor is communicatively coupled, to carry out the functions of the modules disclosed in the present disclosure for initiating pairing and bonding between the Bluetooth device 205 and the peer device 210. In one example, the Bluetooth device 205 is a headless Bluetooth device. The method 400 and the method 500 as described in the flowcharts below is a message sequence chart of interactions between the headless Bluetooth device 205, the peer device 210 and the server 214, as shown in FIG. 3-A-B-C. In one example, the Bluetooth device 205 is provided by a service provider. It is to be noted that, the service provider provides plurality of headless Bluetooth devices, wherein each device (for example, the device 205 as shown in FIG. 2) has an ID number.

Each step is described in further detail below.

The Bluetooth device 205 may store a master key, ID number or identification represented by ID_device in a secure manner. The Bluetooth device 205 may declare DisplayYESNO I/O Capability (though physically not available) in Phase I pairing feature exchange, so that numeric comparison is selected as part of the Bluetooth pairing and bonding protocol.

At step 402, the Bluetooth device 205 generate and set values of one or more parameters for creating a service. In one example, the Bluetooth device 205 may load in values to the one or more parameters such as for example, the SessionNonce_Device, the DataNonce_Device and the ID_device. Before pairing and bonding procedure starts, the device 205 may at step 402, may load the SessionNonce_Device and DataNonce_Device characteristic with their values. The details with respect to the SessionNonce_Device and DataNonce_Device characteristic are described in detail above.

At step 404, the Bluetooth device 205 advertises 'pairing and bonding service UUID' for accepting incoming connection from the peer device 210. The Bonding Service UUID and optionally Individual ID or serial number (also referred to as ID_device) of the Bluetooth device 205 is advertised. For each device, provided by the service provider, a unique master Key is generated by the server 214. To clarify, advertising optionally ID_device, herein means, that the devices 205 can advertise information, which peer device 210 can scan and obtain without connecting. The information that is advertised at the step 404, is Bonding service UUID, however, ID_device of the Bluetooth device 205 is optional to advertise.

It is to be noted that, the server (214) makes available a service functionality with its own 'pairing and bonding service UUID' comprising a plurality of characteristics. The plurality of characteristics are SessionNonce_Device, SessionNonce_SP. DataNonce_Device, DataNonce_SP, UserConfirm_Device, DeviceConfirm_SP, ID_Device, ComputeSessionKey, ReadyForPairing. The details with respect to the plurality of characteristics are explained in detail in FIG. 2.

At step 406, the peer device 210 scans and searches for available Bluetooth devices and selects the Bluetooth device (for example, the device 205) for pairing and bonding based on the advertised 'pairing and bonding service UUID'. In one example, an application is provided by the server 214 for the device 205 which is installed on the peer device 210 (ex: Smartphone). The peer device 210 logs into server 214 associated with the service provider, with the user credentials provided by the user and establishes a secure communication channel with it. This application, when desired by the user, scans for nearby Bluetooth devices 205 and presents to the user, all available Bluetooth devices who are advertising the service provider's Bonding Service UUID. The user selects the device 205 for initiating pairing and bonding procedure. In other example, the peer device (210) scans and compares a public key received Over-The-Air and a printed value by one of a QR code, a Bar code, and plain text for the peer device (210) for allowing pairing and bonding between the peer device (210) and Bluetooth device (205).

At step 408, the peer device 210 reads values of the one or more parameters in the created service and sends them to the server 214. In one example, the server 214, after receiving the one or more parameters, through the peer device 210 loads the SessionNonce_SP and DataNonce_SP characteristics with its values and reads in the device's 205 values.

At step 410, the peer device 210 obtains the values of the parameters from the server 214 and writes into the service in the Bluetooth device 205. The server 214 through the peer device 210 loads the SessionNonce_SP and DataNonce_SP characteristics with its values and reads in the device's 205 values. The peer device 210 may then set ComputeSessionKey. This is a signal set by the peer device 210 after SessionNonce_Device and DataNonce_device is read and SessionNonce_SP and DataNonce_SP are written into.

At step 412, the Bluetooth device 205 notifies 'ready for pairing' on successfully: computing a session key using the one or more parameters read and written by the peer device 210 and received from the server 214 and further generates the verifier nonce which is a substantially random value.

In one example, both, the Bluetooth device 205 and the server 214 may derive session key. Once session key is derived and verifier nonce is generated at the device 205, the device 205 notifies the peer device 210 by writing into ReadyForPairing. This is a signal set by the peer device 210 after SessionNonce_Device and DataNonce_device are read and SessionNonce_SP and DataNonce_SP are written into. After a value is written into this, the device starts computing the session key and also generates a verifier nonce. The generated verifier nonce is sent to server 214 through the peer device 210 and the encrypted random (verifier nonce) value is sent back to the device 210 by server 214 through the peer device 210, so that the device 205 is assured of the peer device's 210 authenticity. The details of the receiving the encrypted random (verifier nonce) value and a processed data from the peer device 210 and processing it for authenticating the received data and, on successful authentication, bonding and communicating securely with the peer device 210 is explained in detail in FIG. 5 below.

It is to be noted that, both the Bluetooth device 205 and the server 214 may generate a new set of SessionNonce_Device, SessionNonce_SP, DataNonce_Device and DataNonce_SP values for each pairing and bonding attempt. After the peer device 210 gets notified by ReadyForPairing, it initiates the pairing and bonding procedure.

Figure 5:
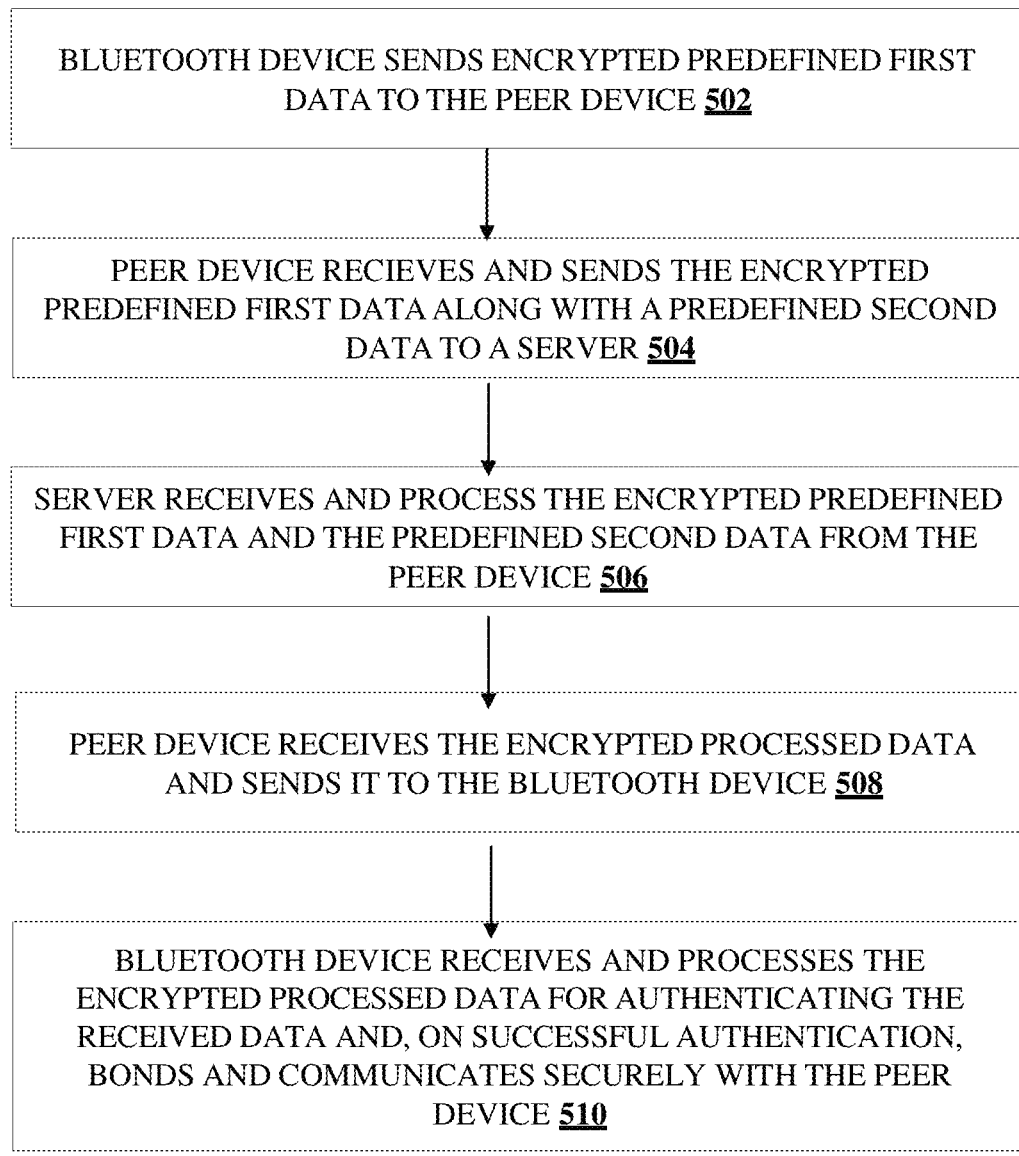
FIG. 5 is a flow chart illustrating a method for establishing a secure connection between a Bluetooth device and a peer device.

FIG. 5 is a flow chart illustrating a method 500 for establishing a secure connection between a Bluetooth device 205 and a peer device 210. FIG. 5 may be described from the perspective of a processor that is configured to execute computer-readable instructions to carry out the functionalities of the Bluetooth device 205, the peer device 210, and the server 214 of FIG. 2. In particular, the steps as described in FIG. 5 may be described from the perspective of a processor that executes computer readable instructions stored in a memory, to which the processor is communicatively coupled, to carry out the functions of the modules disclosed in the present disclosure for ensuring a secure communication between the headless Bluetooth device 205 and the peer device 210. In one example, the Bluetooth device is a headless Bluetooth device.

Each step is described in further detail below.

At step 502, the Bluetooth device 205 sends encrypted predefined first data to the peer device 210. The encrypted predefined first data is obtained by the Bluetooth device 205 by a) appending a first user confirm value to a verifier nonce; b.) authenticating the first user confirm value and the verifier nonce, wherein the step b) of authentication results in a first MAC value; and c.) encrypting the first user confirm value, the verifier nonce, and the resultant first MAC value for obtaining the encrypted predefined first data. Once the encrypted predefined first data is obtained by the Bluetooth device 205, the Bluetooth device 205 sends encrypted predefined first data comprising: the first user confirm value, the verifier nonce value and the first MAC value to the peer device 210.

It is to be noted that the user confirm value generated by the Bluetooth device's 205 controller is referred to as first user confirm value. In one example, after the peer device 210 has started pairing, the Bluetooth device's 205 controller may generate user confirm value. In normal numeric comparison model this value has to be displayed to the user and user's confirmation obtained. In this case this user confirm value along with verifier nonce is encrypted using AES-CCM (RFC3610). The encrypted UserData along with MAC generated (32 bits) is loaded into UserConfirm_Device and sent to the peer device 210.

At step 504, the peer device 210 receives the encrypted predefined first data along with a predefined second data from the Bluetooth device 205. The peer device 210 sends the encrypted predefined first data along with a predefined second data to a server 214. The predefined second data is a second user confirm value.

After receiving ReadyForPairing notification, the peer device 210 may initiate pairing and bonding with Bluetooth device 205. When first user confirm value is received, it may wait for UserConfirm_Device from the device 205, the peer device 210 may send this value (the second user confirm value) along with the first user confirm value it had received over the secure communication channel to the server 214.

At step 506, the server 214 receives and process the encrypted predefined first data and the predefined second data from the peer device 210. The server 214 processes the received encrypted predefined first data and the predefined second data for authenticating. The steps performed by the server 214 for authenticating includes:

a.) receiving the data comprising the encrypted predefined first data and the second user confirm value; In one example, the server 214 receives the first user confirm value, the verifier nonce, the first MAC value, and the second user confirm value.

b.) decrypting the encrypted predefined first data; wherein the decrypted predefined first data comprises the first user confirm value, the verifier nonce and the first MAC value;

c.) authenticating the decrypted first predefined data; wherein this step (c) of authentication results in a second MAC value;

d.) comparing the decrypted first MAC value and the second MAC value;

e.) comparing the first user confirm value and the second user confirm value on successful comparison of decrypted first MAC value and the second MAC value;

f.) appending the decrypted verifier nonce with random number;

g.) authenticating the decrypted verifier nonce and the random number; wherein the step (g.) of authentication results in a third MAC value;

h.) encrypting the "decrypted verifier nonce, the random number and the third MAC value"; and i.) sending the encrypted verifier nonce, the random number and the third MAC value on successful comparison of the first user confirm value and the second user confirm value to the peer device 210. Thus, the server 214 processes the received data for authentication and, on successful authentication, sends the processed data to the peer device 210. The processed data includes the encrypted "verifier nonce, the random number and the third MAC value".

In one example, the server 214 may decrypt and authenticate UserConfirm_Device and compare the first user confirm value of device 205 and second user confirm value of the peer device 210. If they match it may send success message along with encrypted verifier nonce along with a random value to the peer device 210. If they do not match, the server 214 may send failure message and the peer device 210 may send failure message to the Bluetooth controller.

At step 508, the peer device 210 receives the encrypted processed data and sends it to the Bluetooth device 205. At this step, the peer device 210 receives a.) a successful comparison message for allowing pairing between the Bluetooth device 205 and peer device 210 on successful verification; and b.) the encrypted "verifier nonce, the random value and the third MAC" value. The peer device 210 sends the encrypted "verifier nonce, the random value and the third MAC" value to the Bluetooth device 205. The peer device 210 may load this to DeviceConfirm_SP in the device 205 and confirm to the Bluetooth controller.

At step 510, the Bluetooth device 205 receives and processes the encrypted processed data from the peer device 210 for authenticating the received data and, on successful authentication, bonding and communicating securely with the peer device 210. The steps performed by the Bluetooth Device 205 for processing and authenticating the encrypted processed data and, and on successful authentication for bonding and communicating securely with the peer device 210, the said steps comprising:
  a.) receiving the encrypted: verifier nonce, the random value and the third MAC value;
  b.) decrypting the encrypted: verifier nonce, the random value and the third MAC value;
  c.) authenticating the decrypted: verifier nonce, the random value and the third MAC value, wherein the step (c.) of authentication results in a fourth MAC value;
  d.) comparing the decrypted third MAC value and the fourth MAC value;
  e.) verifying the decrypted verifier nonce on successful comparison of decrypted third MAC value and the fourth MAC value;
  f.) allowing pairing and bonding between the Bluetooth device 205 and the peer device 210 on successful verification.

In one example, after a value is written into DeviceConfirm_SP by the peer device 210, the Bluetooth device 205 may decrypt them using AES-CCM. The Bluetooth device 205 verifies the received info by decrypting DeviceConfirm_SP and computing the MAC value. If the computed MAC value and received MAC value does not match, Pairing Failure message is sent. If the sent verifier nonce and received verifier nonce value are same, it may accept the user confirm value sent by the controller, else it may send Failure (No) to the Bluetooth controller.

The method 500 implements Advanced Encryption Standard cipher block chaining message authentication code (AES CCM) for encrypting and decrypting: the first user confirm value, the verifier nonce, the random number, the first MAC value, the second MAC value and the third MAC value. In addition, the method 500 includes a step for determining by an application installed on the peer device (210) that the Bluetooth device (205) is provided by the provider based on one of an identification number and a local name, or both, of the Bluetooth device (205).

The disclosed method may be implemented in applications such as, for example, BLE enabled Onboard Diagnostic II of automotive field (OBD II) dongle. The dongle is configured to access the vehicle's data. The embodiments of the present disclosure may be able to secure the vehicle data. Another example for facilitating security in Bluetooth communication may be a low-cost pulse oximeter without local display.

Figure 6:
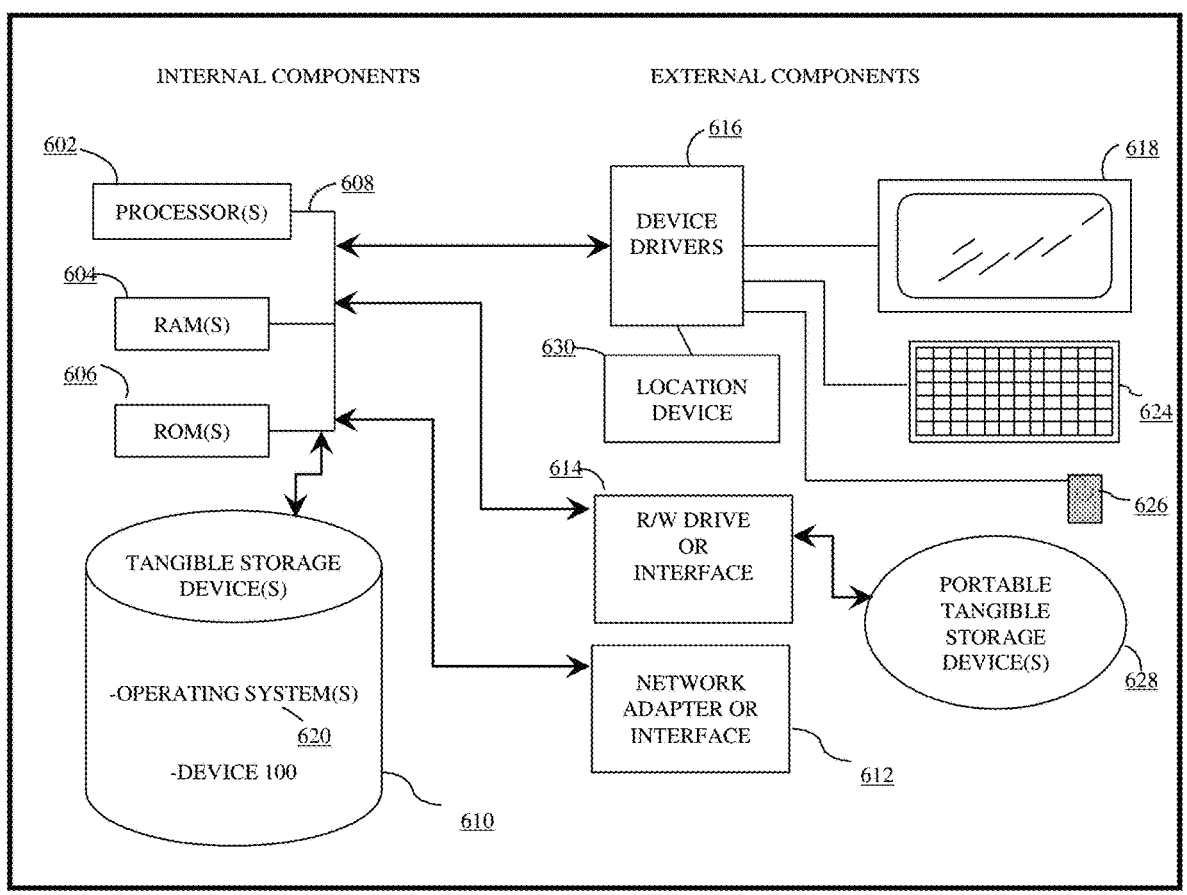
FIG. 6 is a block diagram for of a computing device utilized for implementing the method of FIGS. 4 and 5, implemented according to an embodiment of the present disclosure.

FIG. 6 is a block diagram 600 of a computing device utilized for implementing the system 200 of FIG. 2 implemented according to an embodiment of the present disclosure. The devices and modules of the system 200 described herein are implemented in computing devices. The computing device 600 comprises one or more processor 602, one or more computer-readable RAMs 604 and one or more computer-readable ROMs 606 on one or more buses 608.

Further, the computing device 600 includes a tangible storage device 610 that may be used to execute operating systems 620 and modules existing in the device 100. The various modules of the system 200 can be stored in tangible storage device 610. Both, the operating system and the modules existing in the device 100 are executed by processor 602 via one or more respective RAMs 604 (which typically include cache memory).

Examples of storage devices 610 include semiconductor storage devices such as ROM 606, EPROM, flash memory, or any other computer-readable tangible storage device 610 that can store a computer program and digital information. Computing device also includes R/W drive or interface 614 to read from and write to one or more portable computer-readable tangible storage devices 628 such as a CD-ROM, DVD, and memory stick or semiconductor storage device. Further, network adapters or interfaces 612 such as a TCP/IP adapter cards, wireless WI-FI interface cards, or 3G or 5G wireless interface cards or other wired or wireless communication links are also included in computing device 600. In one embodiment, the devices and modules existing in the system 200 can be downloaded from an external computer via a network (for example, the Internet, a local area network or other, wide area network) and network adapter or interface 612. Computing device 600 further includes device drivers 616 to interface with input and output devices. The input and output devices can include a computer display monitor 618, a keyboard 625, a keypad, a touch screen, a computer mouse 626, and/or some other suitable input device.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

I claim:

1. A method for establishing a secure connection between a Bluetooth device and a peer device, the method comprising: a step of the Bluetooth device sending encrypted predefined first data to the peer device; a step of the peer device receiving the encrypted predefined first data and sending the encrypted predefined first data along with a predefined second data to a server; a step of the server receiving the encrypted predefined first data and the predefined second data from the peer device and processing it for authenticating the received data and, on successful authentication, sending the processed data to the peer device; a step of the peer device receiving the encrypted processed data and sending it to the Bluetooth device; and a step of the Bluetooth device receiving the encrypted processed data from the peer device and processing it for authenticating the received data and, on successful authentication, bonding and communicating securely with the peer device, wherein the steps performed by the Bluetooth device and the peer device for initiating pairing and bonding comprises: a step of the Bluetooth device generating and setting values of one or more parameters for creating a service; a step of the Bluetooth device advertising pairing and bonding service Universally Unique Identifier for accepting incoming connection from the peer device; a step of the peer device scanning and searching for available Bluetooth devices and selecting the Bluetooth device for pairing and bonding based on the advertised 'pairing and bonding service UUID'; a step of the peer device reading values of the one or more parameters in the created service and sending them to the server; a step of the peer device obtaining the values of the parameters from the server and writing into the service in the Bluetooth device; a step of the Bluetooth device notifying 'ready for pairing' on successfully: computing a session key using the one or more parameters read and written by the peer device and received from the server; and generating the verifier nonce which is a substantially random value; and a step of the server making available a service functionality with its own 'pairing and bonding service UUID' comprising a plurality of characteristics, and wherein the plurality of characteristics comprises: SessionNonce_Device, SessionNonce_SP, DataNonce_Device, DataNonce_SP, UserConfirm_Device, DeviceConfirm_SP, ID_Device, ComputeSessionKey, ReadyForPairing.

2. The method as claimed in claim 1, comprising a step of the Bluetooth device obtaining the encrypted predefined first data comprises: a) appending a first user confirm value to a verifier nonce; b.) authenticating the first user confirm value and the verifier nonce, wherein the step (b) of authentication results in a first MAC value; and c.) encrypting the first user confirm value, the verifier nonce, and the resultant first MAC value for obtaining the encrypted predefined first data.

3. The method as claimed in claim 1, wherein the predefined second data comprises a second user confirm value.

4. The method as claimed in claim 1, wherein the steps of the server receiving the encrypted predefined first data and the predefined second data from the peer device and processing it for authenticating comprises: a.) receiving the data comprising the encrypted predefined first data and the second user confirm value; b.) decrypting the encrypted predefined first data; wherein the decrypted predefined first data comprises the first user confirm value, the verifier nonce and the first MAC value; c.) authenticating the decrypted first predefined data; wherein this step (c) of authentication results in a second MAC value; d.) comparing the decrypted first MAC value and the second MAC value; e.) comparing the first user confirm value and the second user confirm value on successful comparison of decrypted first MAC value and the second MAC value; f.) appending the decrypted verifier nonce with random number; g.) authenticating the decrypted verifier nonce and the random number; wherein the step (g) of authentication results in a third MAC value; h.) encrypting the decrypted verifier nonce, the random number and the third MAC value; and i.) sending the encrypted verifier nonce, the random number and the third MAC value on successful comparison of the first user confirm value and the second user confirm value to the peer device.

5. The method as claimed in claim 1, wherein receiving, by the peer device the processed data comprises: a.) a successful comparison message for allowing pairing and bonding between the Bluetooth device and peer device on successful verification; and b.) the encrypted "verifier nonce, the random value and the third MAC value".

6. The method as claimed in claim 1, comprising sending, by the peer device the encrypted "verifier nonce, the random value and the third MAC value" to the Bluetooth device.

7. The method as claimed in claim 1, comprising performing the said steps, by the Bluetooth Device for processing and authenticating the encrypted processed data and, and on successful authentication for bonding and communicating securely with the peer device, the said steps comprising: a.) receiving the encrypted: verifier nonce, the random value and the third MAC value; b.) decrypting the encrypted: verifier nonce, the random value and the third MAC value; c.) authenticating the decrypted: verifier nonce, the random value and the third MAC value, wherein the step (c) of authentication results in a fourth MAC value; d.) comparing the decrypted third MAC value and the fourth MAC value; e.) verifying the decrypted verifier nonce on successful comparison of decrypted third MAC value and the fourth MAC value; f.) allowing pairing and bonding between the Bluetooth device and the peer device on successful verification.

8. The method as claimed in claim 1, wherein the Bluetooth device is a headless Bluetooth device.

9. The method as claimed in claim 1, comprising a step of the Bluetooth device declaring Display YESNO I/O capability for selecting a numeric comparison approach for initiating pairing and bonding with the peer device.

10. The method as claimed in claim 1, comprising implementing Advanced Encryption Standard cipher block chaining message authentication code (AES CCM) for encrypting and decrypting: the first user confirm value, the verifier nonce, the random number, the first MAC value, the second MAC value and the third MAC value.

11. The method as claimed in claim 1, comprising a step of determining by an application installed on the peer device that the Bluetooth device is provided by the provider based on one of an identification number and a local name, or both, of the Bluetooth device.

12. The method as claimed in claim 1, comprising a step of the peer device for allowing pairing and bonding between the peer device and Bluetooth device by scanning and comparing a public key received Over-The-Air and a printed value by one of a QR code, a Bar code, and plain text for the peer device.

13. A system for enabling a headless Bluetooth device for establishing a secure connection with a peer device, the system comprising: the Bluetooth device configured for sending encrypted predefined first data to the peer device;

the peer device configured for receiving the encrypted predefined first data and sending the encrypted predefined first data along with a predefined second data to a server, wherein the predefined second data comprises a second user confirm value; the server configured for receiving the encrypted predefined first data and the predefined second data from the peer device and processing it for authenticating the received data and, on successful authentication, sending the processed data to the peer device; the peer device configured for receiving the encrypted processed data and sending it to the Bluetooth device; and the Bluetooth device configured for receiving the encrypted processed data from the peer device and processing it for authenticating the received data and, on successful authentication, bonding and communicating securely with the peer device, wherein the Bluetooth device and the peer device configured for initiating pairing and bonding comprises: a step of the Bluetooth device generating and setting values of one or more parameters for creating a service; a step of the Bluetooth device advertising pairing and bonding service Universally Unique Identifier for accepting incoming connection from the peer device; a step of the peer device scanning and searching for available Bluetooth devices and selecting the Bluetooth device for pairing and bonding based on the advertised 'pairing and bonding service UUID'; a step of the peer device reading values of the one or more parameters in the created service and sending them to the server; a step of the peer device obtaining the values of the parameters from the server and writing into the service in the Bluetooth device; a step of the Bluetooth device notifying 'ready for pairing' on successfully: computing a session key using the one or more parameters read and written by the peer device and received from the server; and generating the verifier nonce which is a substantially random value, and a step of the Bluetooth device declaring Display YESNO I/O capability for selecting a numeric comparison approach for initiating pairing and bonding with the peer device.

14. The system as claimed in claim 13, wherein the Bluetooth device is configured for obtaining the encrypted predefined first data by: a) appending a first user confirm value to a verifier nonce; b.) authenticating the first user confirm value and the verifier nonce, wherein the step (b) of authentication results in a first MAC value; and c.) encrypting the first user confirm value, the verifier nonce, and the resultant first MAC value for obtaining the encrypted predefined first data.

15. The system as claimed in claim 13, wherein the server is configured for receiving the encrypted predefined first data and the predefined second data from the peer device and processing it for authenticating, the steps performed by the server are: a.) receiving the data comprising the encrypted predefined first data and the second user confirm value; b.) decrypting the encrypted predefined first data; wherein the decrypted predefined first data comprises the first user confirm value, the verifier nonce and the first MAC value; c.) authenticating the decrypted first predefined data; wherein this step (c) of authentication results in a second MAC value; d.) comparing the decrypted first MAC value and the second MAC value; e.) comparing the first user confirm value and the second user confirm value on successful comparison of decrypted first MAC value and the second MAC value; f.) appending the decrypted verifier nonce with random number; g.) authenticating the decrypted verifier nonce and the random number; wherein the step (g) of authentication results in a third MAC value; h.) encrypting the decrypted verifier nonce, the random number and the third MAC value; and i.) sending the encrypted verifier nonce, the random number and the third MAC value on successful comparison of the first user confirm value and the second user confirm value to the peer device.

16. The system as claimed in claim 13, wherein the peer device is configured for: receiving the processed data, the processed data comprising: a.) a successful comparison message for allowing pairing and bonding between the Bluetooth device and peer device on successful verification and b.) the encrypted "verifier nonce, the random value and the third MAC value"; and sending, the encrypted "verifier nonce, the random value and the third MAC value" to the Bluetooth device.

17. The system as claimed in claim 13, wherein the Bluetooth Device is configured for performing the said steps for processing and authenticating the encrypted processed data and, and on successful authentication for bonding and communicating securely with the peer device, the said steps comprising: a.) receiving the encrypted: verifier nonce, the random value and the third MAC value; b.) decrypting the encrypted: verifier nonce, the random value and the third MAC value; c.) authenticating the decrypted: verifier nonce, the random value and the third MAC value, wherein the step (c) of authentication results in a fourth MAC value; d.) comparing the decrypted third MAC value and the fourth MAC value; e.) verifying the decrypted verifier nonce on successful comparison of decrypted third MAC value and the fourth MAC value; f.) allowing pairing and bonding between the Bluetooth device and the peer device on successful verification.

* * * * *